United States Patent [19]

Krasner et al.

[11] 4,139,126

[45] Feb. 13, 1979

[54] REFILLABLE ICE DISPENSING APPARATUS

[75] Inventors: Fred C. Krasner, Lincolnwood; Milton M. Graupe, Skokie; Kenneth W. Zeuschner, Morton Grove, all of Ill.

[73] Assignee: Lern, Inc., Chicago, Ill.

[21] Appl. No.: 797,518

[22] Filed: May 16, 1977

[51] Int. Cl.[2] .............................................. B65G 65/48

[52] U.S. Cl. ................................ 222/146 C; 222/410; 222/504; 241/282.1; 241/DIG. 17

[58] Field of Search ............... 222/146 R, 146 C, 226, 222/227, 254, 410, 412, 504, 517, 556; 141/351, 360-362; 241/199.1, 282.1, 282.2, DIG. 17; 62/320, 340

[56] References Cited

U.S. PATENT DOCUMENTS

| | | | |
|---|---|---|---|
| 439,495 | 10/1890 | Everett | 222/410 X |
| 2,435,039 | 1/1948 | Harper | 222/410 X |
| 2,665,852 | 1/1954 | Shively | 241/DIG. 17 |
| 2,706,385 | 4/1955 | Topping | 222/146 C X |
| 2,930,596 | 3/1960 | Waters | 241/282.1 X |
| 3,133,674 | 5/1964 | Schmaus | 222/504 X |
| 3,196,628 | 7/1965 | Reynolds | 141/361 X |
| 3,216,473 | 11/1965 | Dewenter | 241/282.1 X |
| 3,393,839 | 7/1968 | Weil et al. | 222/239 |
| 3,517,860 | 6/1970 | Whalen | 222/202 |

*Primary Examiner*—Stanley H. Tollberg
*Assistant Examiner*—Fred A. Silverberg
*Attorney, Agent, or Firm*—Alter and Weiss

[57] ABSTRACT

A refillable ice dispensing apparatus for automatically vending ice in cracked, chipped or cubed shapes. Use of an oblong shaped storage bin with drainage means and having a specially designed agitation system and ice jogging system facilitates even and relatively complete circulation of the stored ice to a release aperture. A solenoid controlled dispensing gate cooperates with the agitation system to dispense the stored ice, and utilizes lost motion linkage connections with the gate in order to create momentum before lifting of the gate is commenced.

13 Claims, 5 Drawing Figures

REFILLABLE ICE DISPENSING APPARATUS

BACKGROUND OF THE INVENTION

The present invention relates in general to food service vending and dispensing equipment and in particular to a refillable ice dispensing apparatus for automatically dispensing cracked, chipped or cubed ice.

For several years now various apparatus have been utilized for automatically dispensing ice cubes into a user's glass or pitcher. For the most part, however, most of the conventional existing ice vending or dispensing apparatus combine the dispensing features with an ice-making system through the utilization of substantially complex mechanical conveyors and the like.

Some of the existing ice-making, ice vending apparatus are typified by a series of Weil, et al. references. The first of these inventions is disclosed in U.S. Pat. No. 3,165,901 in which an ice-making and ice-crushing apparatus are integrally merged (as shown in FIG. 3). This particular invention utilizes an insulated hopper (numeral 16 as shown in FIG. 7) which is inverted and having a generally rectangular pyramidal form with downwardly and inwardly inclined walls. This invention utilizes a reciprocating block (numeral 24 as shown in FIG. 7) to align the opening of the dispenser to deliver ice to a hopper and chute. In yet another Weil et al. invention, that disclosed in U.S. Pat. No. 3,217,509, an ice-making and vending apparatus (as shown in FIG. 10) is similarly disclosed in which crushed ice is elevated by a scoop and discharged into a hopper. From the hopper the scoop assembly elevates the ice to dispensing means located adjacent the top of an elevator and utilizes a normally closed manually operated flap valve. In U.S. Pat. No. 3,274,792, an ice maker has been combined with a piston-type ice remover to accomplish the same general purposes of producing the ice and processing it further to a dispensing apparatus for relatively convenient utilization by a user. This is shown in FIGS. 1 and 4 of the reference patent.

In other prior art references, ice-handling apparatus have been used separately from the ice-making apparatus for the sole purposes of dispensing the ice. In U.S. Pat. No. 3,211,338, a handling apparatus (as described by numeral 24 of FIG. 2) is disclosed for combination with an ice manufacturing device for raising the level of the ice for subsequent dispensing as shown in FIG. 2.

More recently, dispensers have been utilized which have been totally nonreliant upon an ice-making machine but which are instead refillable, usually from the top, with ice for subsequent storage and dispensing. Two such references, those disclosed in FIGS. 1 and 2 of Weil et al., U.S. Pat. No. 3,393,839 and in FIG. 1 of Whalen, U.S. Pat. No. 3,517,860, illustrate such devices.

It should be realized that the utilization of both types of dispensing apparatus, those which are combined with the ice makers, and those which are totally independent dispensing devices, have still possessed some problems. Among these problems are the lack of appropriate drainage for such devices to remove melted water from the quantity of ice stored within the dispensing apparatus to thereby preclude problems associated with substantial puddles continuously mixing with the ice. Additionally, few if any of the existing dispensing devices utilize efficient dispensing gate mechanisms which can more efficiently and more tightly seal and insulate the entire contents of such device. Further, in many of the conventional dispensing devices, ice may often jam or freeze into oversized chunks or masses of ice incapable of easily being dispensed due to the failure of the conventional device to utilize ice leveling, jogging, and antijamming devices.

It is thus an object of the present invention to provide an improved refillable ice dispensing apparatus which can be easily and quickly filled with a quantity of ice and which effectively insulates its frozen contents against contaminants and external temperatures to maintain the ice in its frozen form for a longer period of time.

It is also an object of the present invention to provide an improved dispensing apparatus with means for automatic drainage, automatic activation and with improved automatic dispensing gate means for the purpose of more effectively insulating the ice therein.

It is further an object of the present invention to provide such an apparatus which is shaped to improve dispensing characteristic of the ice from its storage position within the apparatus and which utilizes leveling and jogging features to improve distribution of the ice into the dispensing mechanism and to reduce jamming and/or clustering of the frozen contents.

These and other objects of the invention will become apparent in light of the present specification.

SUMMARY OF THE INVENTION

The present invention comprises a refillable ice dispensing apparatus for automatically vending ice in substantially chunk form such as in cracked, chipped, cubed or minicubed shapes. The invention comprises an ice storage bin, having a substantially oblong shape which encloses the stored ice and insulates it so as to prevent undesirable melting. Agitator means are adjacent the bottom interior surface of the storage bin for directing a quantity of the ice rotatably about the bottom of the storage bin itself. The agitator means are powered by motor means located on the outside of the storage bin and connected by shaft or other equivalent means to the agitator means to enable its rotatable movement. Bin aperture means are adjacent the interior bottom portion of the storage bin and provides a release hole through which the ice may be released from the storage bin as it is prompted thereto by the rotating action of the agitator means. Dispenser gate means are proximate the bin aperture means, preferably on the exterior surface of the ice storage bin, for alternatively opening and closing the bin aperture means for the release and/or nonrelease of the ice from the ice storage bin. Apparatus switching means are utilized to activate the agitator motor means and dispensing gate means in a simultaneous fashion for the dispensing of the ice. All these component parts are stored within cabinet means which enclose the ice storage bin and its internal and immediately external portion in an upper cabinet portion.

The preferred embodiment of the invention further includes the utilization of storage bin drainage means for removing the melted portion of water from the storage bin means. In this preferred embodiment, the storage bin drainage means comprises a downwardly sloping bottom portion of the ice storage bin for effectively draining the melted water from the quantity of ice stored within the storage bin. At the lowest point of said downwardly sloping bottom portion, there exists water release means such as a drain, or coupling for connection to further drainage circuitry.

The preferred embodiment of the invention further comprises the utilization of additional ice jogging means for improving effective agitation of the chunks of ice along the bottom portion of the storage bin for improved dispensing characteristics. One such ice jogging means comprises an ice leveling rod which is restrainably affixed at one end to a first position proximate to the top interior portion of the storage bin. The other end of the ice leveling rod is attached to the second position substantially proximate to the bottom interior portion of the storage bin for effectively distributing the quantity of filled ice along and towards the bottom portion of the ice storage bin for subsequent dispensing.

In another embodiment of the invention, the jogging means comprise a plurality of jogging blocks which are restrainably affixed to the interior bottom surface of the ice storage bin means for improving the agitation of the quantity of ice as it is agitated by the agitator motor means and the agitator means to in turn direct the quantity of ice rotatably about the bottom of the storage bin towards the periphery of the bin means. The utilization of jogging blocks, for example, dislodges clusters of ice which may have frozen together as well as portions of ice which could conceivably become jammed underneath the blades of the agitator means.

The bin aperture means, to which the ice is directed during the agitation process, is located in the side of the ice storage bin adjacent the interior bottom of the ice storage bin along the widest portion of the oblong shaped storage bin. The bin aperture means accordingly is positioned at a maximum distance from the edge of the agitator means adjacent the bottom interior surface of the ice storage bin means. The positioning of the bin aperture means at such a location provides for an increased storage area to which the agitated ice may be directed for effective accumulation of ice for positive dispensing characteristics when agitation has commensed and the dispensing gate means are opened for the passage of this directed and accumulated ice from the ice storage bin to a container being filled with this ice.

In a preferred embodiment of the invention, the agitator means comprises a plurality of substantially symmetrical agitator arms radiating from the hub portion connected to the previously mentioned agitator motor shaft. While two, four, or even more arms may be utilized, the preferred embodiments of the invention calls for a rake angle imparted to the arms of substantially fifteen degrees.

The dispensing gate means comprises gate bracket means for attachment of the gate dispensing means to the exterior side of the ice storage bin means proximate to the bin aperture means. A hinged gate member is aligned with the bin aperture means and is pivotally attached to the gate bracket means to be movable from a substantially sealed insulating position juxtaposed to the gate brackets to an open position detached from the bracket means except for one side where hinged attachment is maintained. The gate member is additionally spring-loaded about its hinged attachment to the bracket to its substantially sealed position sealing off the bin aperture means. Solenoid motor means are operably connected to the gate member for opening the gates and releasing the gates to enable a spring-loaded return to its sealed position. Additionally, lost motion means are incorporated between the gate member and the solenoid means for imparting momentum to the solenoid means before the gate member is opened from its sealed position.

In the preferred embodiments of the invention, the lost motion means comprises two or more pin connection linkages between the solenoid motor means and the gate member, said pin connection linkages providing slack to the gate dispensing apparatus when it is in its sealed position. This slack is withdrawn by the solenoid motor means after initial activation by the apparatus switching means, thereby enabling preliminary loading of the solenoid motor means before lifting of the gate member commences.

The switching means used to activate the dispensing gate means and the agitation motor and agitation means comprises an electrical switching device preferably located in the lower portion of the cabinet means substantially proximate to the dispensing gate means. Such positioning enables the simultaneous activation of the dispensing gate means and agitator means while at the same time enabling the positioning of a container to be filled with said dispensed ice in a facilitated manner to collect such ice. With such an arrangement, activation of the electrical components of the dispensing apparatus and positioning of the container for filling with ice may be done in one operation with one hand of the user and not require separate activation and positioning to be done by the user.

It has similarly been found that by fabricating the portion of the ice storage bin proximate to the bin aperture means in a substantially flattened configuration, improved ice passage characteristics may be obtained. Accordingly, this flattened-in portion is additionally part of the preferred embodiment of the invention. The invention can be further refined and/or embellished with additional features to make its utilization more practical and/or more complete towards its ice dispensing function. For example, ice volume metering means may be incorporated into the bin aperture, dispensing gate apparatus for the purpose of dispensing a consistent equivalent quantity of said ice into the ice receiving container. Additionally, in another embodiment, the invention further includes water faucet means which are combined therewith for the provision of tap water and the like for use in combination with the dispensed ice.

DETAILED DESCRIPTION OF THE DRAWINGS

Figure 1:
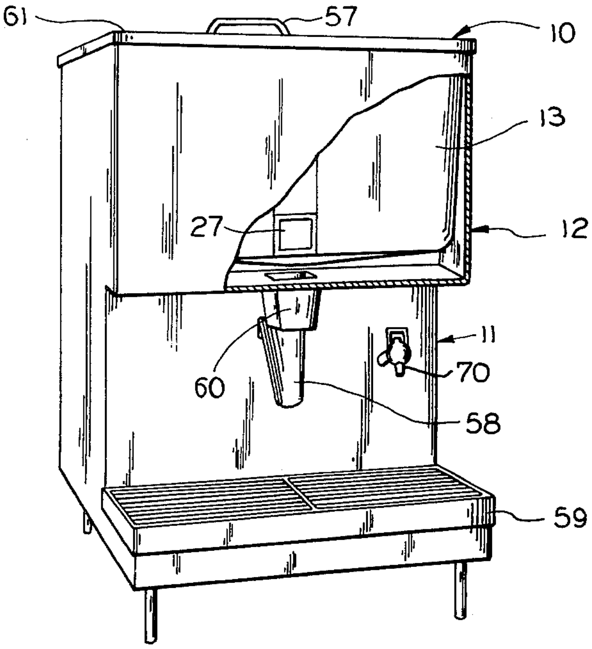
FIG. 1 is a side perspective view of the ice dispensing apparatus of the present invention showing particularly in cut-away fashion the location of the ice storage bin.

While this invention is susceptible of embodiment in many different forms there is shown in the drawings and will herein be described in detail, one specific embodiment with the understanding that the present disclosure is to be considered as exemplification of the principles of the invention and is not intended to limit the invention to the embodiment illustrated.

Refillable ice dispensing apparatus 10 is shown in FIG. 1 in cut-away fashion in which upper portion 12 of the cabinet and lower portion 11 are shown. Ice storage bin 13 is shown positioned in upper portion 12 with dispensing gate apparatus 27 covering bin aperture means (not shown) on the front side of storage bin 13. Also shown in FIG. 1 is ice communication spout 60, apparatus switching means 58 positioned in lower portion of the apparatus cabinet 11 and removable apparatus cover 61 with handle 57 which enables filling of bin storage means 13 with quantities of ice. FIG. 1 also shows the utilization of drain means 59 for the purpose of collecting any excess ice or melted drippings which should be released from the apparatus during its operation. Water faucet means 70 is similarly shown.

Figure 2:
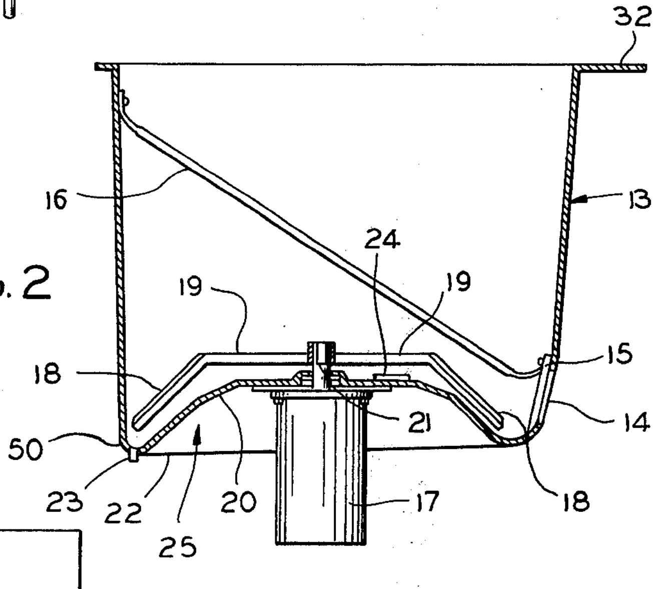
FIG. 2 is an elevational cross-sectional view of the ice storage bin.

FIG. 2 of the invention shows in general a sectional view of storage bin 13. Ice leveling means 16 is attached near the upper edge lip 32 of the device and is sloped downwardly for attachment of its other end proximate to the bottom surface 25 of the bin 13. The utilization of such an ice jogging means evenly distributes quantity of ice spilled into the storage bin for subsequent agitation by agitator arms 18–19, powered by agitator motor 17 connected by shaft 21. In this particular embodiment, bin aperture means 14 permits the release of ice through aperture frame 15 when aperture means 14 is not otherwise sealed on the exterior side of bin 13 by a dispensing gate member. Bin drainage means 22 is also shown comprising a downwardly sloping bottom configuration for the apparatus for the purpose of effectively draining melted water from the storage bin. This downwardly sloping bottom portion 22 leads, at its lowest level, to water release means 23 here comprising a release drain, which can be connected to further drainage circuitry. Besides utilizing a particular configuration having a downwardly sloping bottom portion 22, the bottom 25 of the storage bin 13 is also fabricated with oblique portions 20 instead of sharp corners to prevent the ice from being crushed under agitation and to allow the ice to move in front of the moving agitator for more effective dispensing.

As can be seen, the oblong shaped storage bin 13 embodies the bin aperture means 14 at a position proximate to the wider end of the oblong configuration so that downwardly bent blade portion 18 is positioned farther from aperture 14 than blade portion 18 is positioned from bin rear 50 in order to prompt the flow of agitated ice clusters towards aperture 14 for subsequent release and dispensing.

Figure 3:
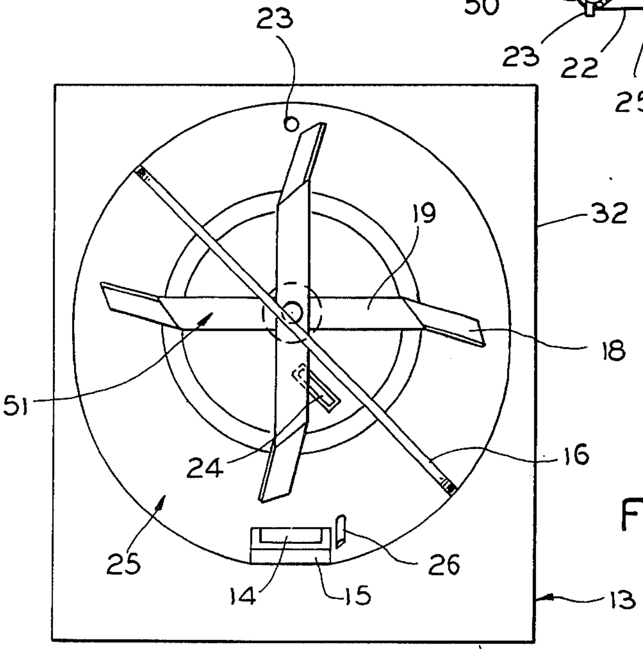
FIG. 3 is an overhead view of the storage bin assembly shown in FIG. 2.

Storage bin device 13 is also shown in FIG. 3 in which agitation blade 51 is more clearly shown having substantially horizontal portion 19 and downwardly sloping portion 18. It should be noted that agitation blade 51, in the preferred embodiment, incorporates rake angles of substantially fifteen degrees on each arm of the agitation blade, such as arm 19, for improved prompting of the stored ice towards aperture 14 and aperture frame 15. Also shown in FIG. 3, are jogging block 24 and jogging block 26. Jogging block 24 is affixed towards the centralized portion of the bottom 25 of storage bin 13 to offer resistance to break up clumps of ice as they are being agitated by blades 51. Jogging block 26 additionally dislodges accumulating ice being prompted into aperture region 14 and aperture frame 15 for appropriate dispensing of the ice through such aperture. Also shown in FIG. 3 is water release means 23 depicted in this embodiment by a drainage spigot and ice leveling rod 16.

Figure 4:
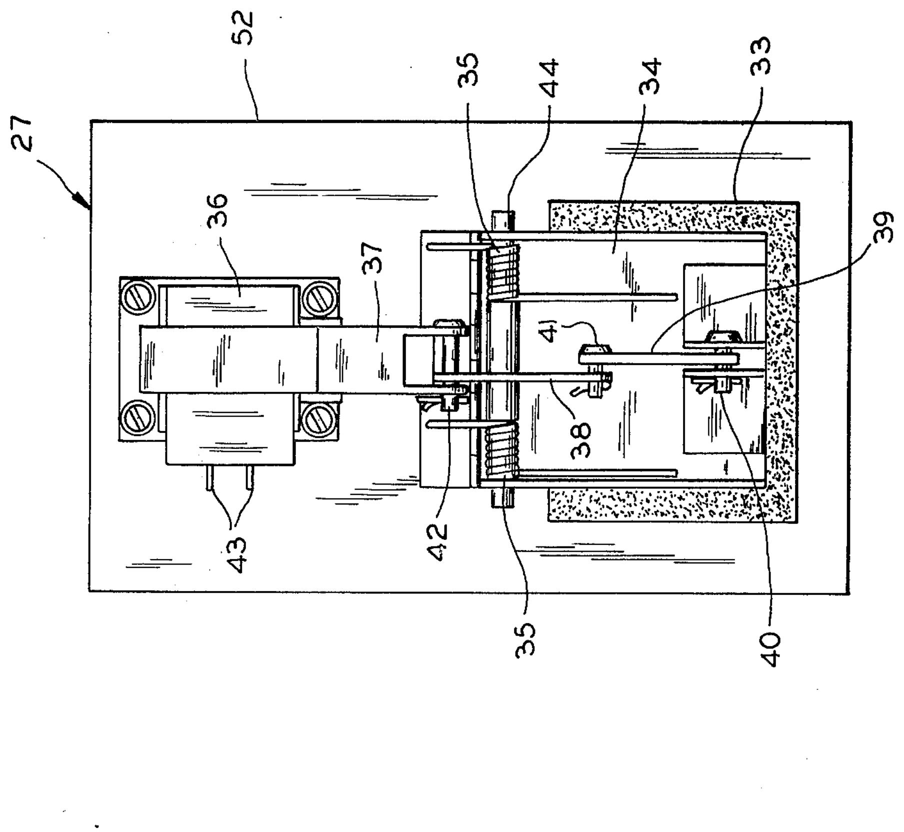
FIG. 4 is a front elevational view of the dispensing gate apparatus of the present invention having formed therein lost motion means for improved operating characteristics.

FIG. 4 of the drawings shows in greater detail, the dispensing gate device utilized in the ice dispensing apparatus. Gate bracket means 52 enables attachment of gate dispensing means 27 to the exterior side of the ice storage bin means proximate to the bin aperture. Gate member 34 is attached to bracket 52 at hinge 44 and is spring-loaded to exert pressure downwardly into the closed sealed position by spring 35. Gate member 34 is movable from a substantially sealed insulating position juxtaposed against gate bracket 52 and here against substantially flexible sealing means 33, to an open position hingedly detached from the bracket means. Solenoid motor means 36 with electrical terminals 43 is positioned above the gate and, through solenoid member 37, pinned at pin 42 to linkage 38, which is pinned at pin 41 to linkage 39 which is in turn connected at pin 40 to gate 34, operable connection of the solenoid motor to the gate member 34 is obtained.

Figure 5:
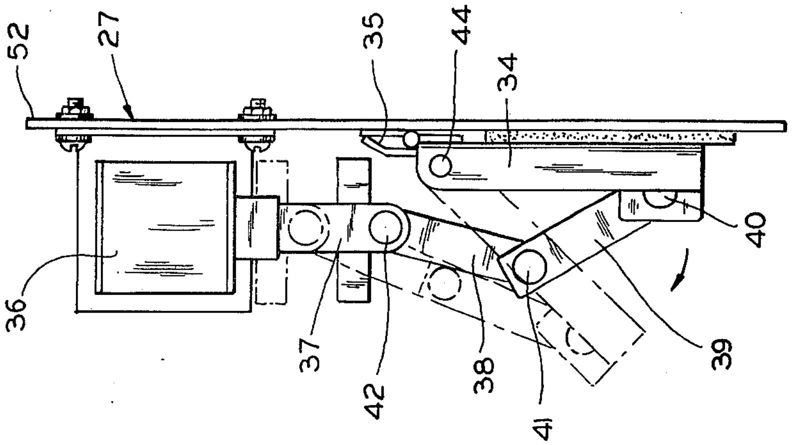
FIG. 5 is a side elevational view of the dispensing gate apparatus of FIG. 4 showing in dash lines the gate member orientated in its operating open position.

As can be seen in FIG. 5, the invention provides for lost motion means in which solenoid member 37 is attached to connection linkages 38 and 39 through pinned portions 42, 41 and 40 respectively. As shown in FIG. 5, when gate 34 is at its closed sealed position due to the exertion of tension from spring 35 about hinge 44, a pivotable slacked connection is formed between linkages 38 and 39 at pin 41. As solenoid member 37 is retracted forceably by solenoid motor 36 on bracket 52, the slack between members 38 and 39 is decreased until linkage members 38 and 39 form a straight line at which time gate 34 is lifted upwardly from its bottom sealed position, to enable dispensing and release of the ice stored within the bin storage means. It should be quite apparent that utilization of a slack linkage as described above enables a certain amount of momentum to be built up by the solenoid motor 36 as it is activated by appropriate switching means. By such a configuration, the gate member 34 may be strongly urged by spring 35 against bracket 52 so as to effectively seal and insulate the ice within the storage bin, while avoiding the use of a substantially large solenoid motor means to effectively lift the gate. Thus the gate may be sealed more strongly and may more effectively insulate the apparatus while at the same time a substantially smaller, more efficient solenoid motor configuration can be adopted by relying upon a certain amount of momentum to be inertially built up before actual opening of gate 34 commences.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A refillable ice dispensing apparatus for automatically vending ice in substantially chunk form, said apparatus comprising:

ice storage bin means having a substantially oblong shape, said ice storage bin means substantially enclosing said stored ice and insulating said stored ice so as to prevent melting thereof;

agitator means adjacent the bottom interior surface of said storage bin means for directing a quantity of said ice rotatably about the bottom of said storage bin;

agitator motor means outside said storage bin means for powering said agitator means in a rotating fashion within said storage bin means;

bin aperture means adjacent the interior bottom of said storage bin proximate to said agitator means, through which said ice may be released from said storage bin as prompted thereto by said rotating action of said agitator means, said agitator means being located within said ice storage bin means in an offset position so as to create a substantially greater space between said agitator means and said bin aperture means than the space between said agitator means and said ice storage bin means at a position opposite to said bin aperture means, said agitator means cooperating with said greater spacing proximate to said bin aperture to accumulate said quantity of ice at said space for release through said bin aperture means;

dispensing gate means proximate said bin aperture means for alternatively opening and closing said bin aperture means for release, and non-release respectively of said ice from said ice storage bin means;

apparatus switching means for activating said agitator motor means and said dispensing gate means for dispensing of said ice; and cabinet means enclosing said ice storage bin means, and said agitator means in an upper cabinet portion.

2. The refillable ice dispensing apparatus of claim 1 in which the invention further comprises storage bin drainage means for removing melted portions of said ice from said storage bin means.

3. The invention according to claim 2 in which said storage bin drainage means comprises a downwardly sloping bottom portion of said ice storage bin for effectively draining melted water from the storage bin, the lowest portion of said downwardly sloping bottom portion having water release means associated therewith.

4. The refillable ice dispensing apparatus of claim 1 in which said invention further comprises:

ice jogging means for further effectively agitating the position of said ice chunks along the bottom of said storage bin means for improved dispensing characteristics of said apparatus.

5. The invention according to claim 4 in which said ice jogging means comprises an ice leveling rod restrainably affixed at one end to a first position proximate to the top interior portion of said storage bin, said other end of said ice leveling rod attached at a second position substantially proximate to the bottom interior portion of said storage bin for effectively distributing said quantity of filled ice along and towards the bottom portion of said ice storage bin for subsequent dispensing.

6. The invention according to claim 4 in which said ice jogging means comprises:

a plurality of jogging blocks restrainably affixed to the interior bottom surface of said ice storage bin means for improved agitation of said quantity of ice as said agitator motor means and said agitator means direct said quantity of said ice rotatably about the bottom of said storage bin towards the periphery of said bin means.

7. The invention according to claim 1 in which said agitator means comprises a plurality of symmetrical agitator arms radiating from a hub portion with a rake angle of substantially fifteen degrees.

8. The invention according to claim 1 in which said dispensing gate means comprises:

gate bracket means for attachment of said gate dispensing means to the exterior side of said ice storage bin means proximate to said bin aperture means;

a hinged gate member aligned with said bin aperture means, said gate member movable from a substantially sealed insulating position juxtaposed to said gate bracket means to an open position hingedly detached from said bracket means, said gate member being springedly maintained in said substantially sealed position;

solenoid motor means operably connected to said gate member for opening said gate and releasing said gate for sprung return to its sealed position, and lost motion means between said gate member and said solenoid means for imparting momentum to said solenoid means before said gate member is opened from its sealed position.

9. The invention according to claim 8 in which said lost motion means comprises two or more pinned connection linkages between said solenoid motor means and said gate member, said pinned connection linkages providing slack to said gate dispensing apparatus, said slack being withdrawn by said solenoid motor means after initial activation by said apparatus switching means, thereby enabling preliminary loading of said solenoid motor means before lifting of said gate member commences.

10. The invention according to claim 1 in which said switching means comprises an electrical switch device in a lower portion of said cabinet means proximate to said dispensing gate means for simultaneous activation of said dispensing gate means and said agitator means, while enabling positioning of a container in a facilitated manner to collect said dispensed ice.

11. The invention according to claim 1 in which said portion of said ice storage bin means proximate to said bin aperture means is substantially flattened for improved ice passage characteristics.

12. The refillable ice dispensing apparatus of claim 1 in which the invention further comprises ice volume metering means for dispensing a consistent equivalent quantity of said ice.

13. The refillable ice dispensing apparatus according to claim 1 in which the invention further includes water faucet means combined therewith for the provision of tap water together with said ice.

* * * * *